United States Patent [19]
Jakoubovitch

[11] Patent Number: 5,812,365
[45] Date of Patent: Sep. 22, 1998

[54] MOUNTING DEVICE FOR POWER CAPACITOR BANKS

[76] Inventor: Albert Jakoubovitch, FOS F-34320, Roujan, France

[21] Appl. No.: 537,667

[22] PCT Filed: Jan. 26, 1995

[86] PCT No.: PCT/FR95/00091

§ 371 Date: Aug. 7, 1996

§ 102(e) Date: Aug. 7, 1996

[87] PCT Pub. No.: WO95/22155

PCT Pub. Date: Aug. 17, 1995

[30] Foreign Application Priority Data

Feb. 9, 1994 [FR] France ..................................... 94 01555

[51] Int. Cl.⁶ .............................. H01G 4/38; H05K 7/20; H02B 1/01
[52] U.S. Cl. .......................... 361/328; 361/303; 361/715; 361/716; 361/811; 361/830
[58] Field of Search .................................. 361/303–306.3, 361/328–330, 734, 810–811, 829–831, 268, 270, 715–716

[56] References Cited

U.S. PATENT DOCUMENTS

| 4,211,957 | 7/1980 | Alley et al. ............................... 361/270 |
| 4,499,524 | 2/1985 | Shioleno . |
| 5,367,431 | 11/1994 | Kunishi et al. .......................... 361/329 |

FOREIGN PATENT DOCUMENTS

| 8802745 | 2/1989 | Germany . |
| 9317439 | 9/1993 | WIPO . |

OTHER PUBLICATIONS

Database WPI, Week 7651, Derwent Publications Ltd, London, GB; AN 76–M0905X & SU, A, 502 381 (Gatterman) (No Date Provided).

*Primary Examiner*—Bot L. Ledynh
*Attorney, Agent, or Firm*—Frijouf, Rust & Pyle, P.H.

[57] ABSTRACT

The device is disclosed for the mounting and cooling of a capacitor. The device comprises of a pair of metal bars made of a thermally and electrically conductive material. The capacitor is fastened to the pair of metal bars. Water is circulated through channels defined in the pair of metal bars for cooling the capacitor.

6 Claims, 1 Drawing Sheet

MOUNTING DEVICE FOR POWER CAPACITOR BANKS

BACKGROUND OF THE INVENTION

1. Field of the Invention

The invention relates to electricity and more particularly to an apparatus for mounting and cooling capacitors.

2. Information Disclosure Statement

The appearance of power transistors and SCR's led to modifying the generators intended for inductive heating.

The supply voltages for these switching devices are usually less than 1,000 V.

As a result, the voltages supplied by transistor or SCR-based inductive heating generators are less than $1,000 \times \sqrt{2}$, i.e. about 700 V. In practice, most of these power sources deliver voltages comprised between 250 and 700 V.

The need to use an inductor, i.e. a reactor to transfer the power from the generator to the load to be heated, necessitates the creation of a reactive power whose value is usually 8 to 40 times that of the active power.

Consequently, it is necessary to have capacitor banks combined with the inductor, with properties allowing high currents to be supplied at voltage levels less than 700 V.

The operating frequencies of these devices are usually in the range of 40 to 400 kHz.

One of the classical means to build such banks is to mount in parallel capacitors with the highest capacitance possible and capable of delivering currents of a few ten to a few hundred amperes.

Assembling a high number of elements sets several technical problems:

- The large magnetic fields created by each capacitor in the bank may cause the heating by induction of the capacitors located close to the bank output terminals.
- The use of capacitors with high capacitance values may produce resonance between two or several capacitors in the a bank. This phenomenon, when occurring, will destroy the bank elements.
- The capacitors in the bank are usually placed between two copper plates cooled by water circulation; as a consequence, the whole bank or the greatest part of it will have to be disassembled to replace a capacitor.
- The parallel mounting of a large number of capacitors results in the creation of a high current that must be conveyed to the bank output terminals through connecting means designed to generate negligible ohmic and inductive voltage drops.

These conditions are difficult to achieve.

The device hereunder solves all these problems.

SUMMARY OF THE INVENTION

This system deals with a means to group power capacitors cooled by conduction into banks containing any number of elements. The purpose of this device is to reduce to a negligible value the inductance of connecting terminals as well as the magnetic field generated by the currents flowing from each capacitor. Whilst mainly intended for inductive heating applications, this device also allows the conduction of the capacitor banks to the user inductor.

The device under this invention is mainly comprised of one or several pairs of metal bars made of thermally and electrically conductive to material, including the fastening means for the capacitors and cooled by water circulation through a channel provided over the whole length of bar.

DESCRIPTION OF THE PREFERRED EMBODIMENT

Figure 1:
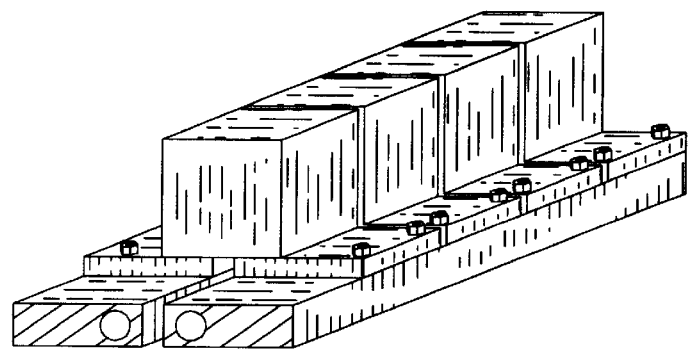
FIG. 1 illustrates a plurality of capacitors laid out on one side of cooling bars.

It will be described, as a non restrictive example, by reference to FIG. 1 showing the device according to the invention, and to FIG. 2 which shows another possible embodiment of said device.

It is mainly comprised of two or several bars (3) made of thermally and electrically conductive metal cooled by channels (4) through which water (4) flows.

The capacitors are laid out astride two bard (3) by means of fastening screws (5).

Figure 2:
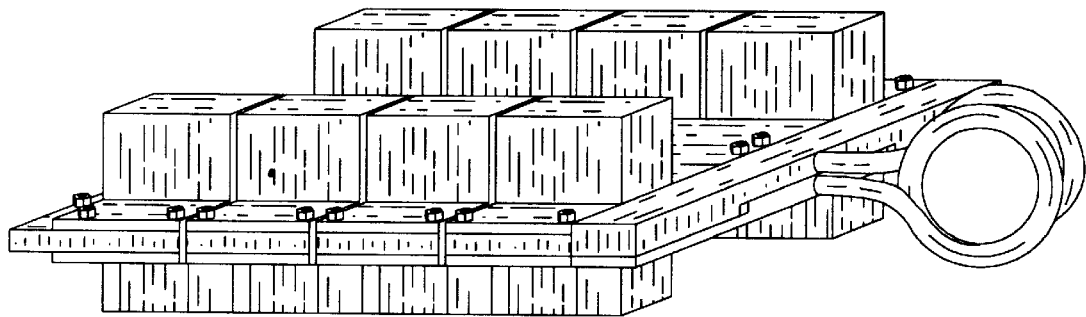
FIG. 2 illustrates a plurality of capacitors laid out on both sides of cooling bars.

The capacitors (1) can be laid out in any number, either on one side of the cooling bars (3) as illustrated in FIG. 1, or on both sides as illustrated in FIG. 2.

The distance between the collector bars cooled by water circulation is reduced down to a gap about 1 to 5 mm wide in order to confine the magnetic field created by the current flowing from each capacitor between the bars.

The magnetic field created by the large currents flowing between the collector bars (3) becomes little disturbing in as much as the distance between the magnetic field and the location of the nearest metal part is greater than the gap between the two bars.

It is thus possible to build assemblies with over 1,000 kVAR reactive power in volumes of about 0.1 cubic foot.

The bar ends may advantageously be connected on one side of the capacitor bank to the terminals (6) of inductor (7) and, on the other side, fitted with terminals (8) for connection onto the generator.

I claim:

1. A device for cooling a capacitor with circulating water, the capacitor having plural electrical terminals, comprising:
   a pair of collector bars;
   each of said pair of collector bars being electrically and thermally conductive;
   a pair of fasteners securing the plural electrical terminals of the capacitor to said pair of collector bars, respectively;
   a channel extending through each of said pair of collector bars; and
   said channels being connected to the circulating water for cooling said pair of collector bars thereby.

2. A device for cooling a capacitor with circulating water as set forth in claim 1, wherein said capacitor comprises a plurality of capacitors connected in electrical parallel.

3. A device for cooling a capacitor with circulating water as set forth in claim 1, wherein said pair of collector bars as disposed in a parallel relationship.

4. A device for cooling a capacitor with circulating water as set forth in claim 1, wherein each of said pair of collector bars is a metallic collector bar.

5. A device for cooling a capacitor with circulating water as set forth in claim 1, wherein one of the plural electrical terminals of the capacitor is connected to an electrical generator and wherein the other of the plural electrical terminals of the capacitor is connected to an electrical inductor.

6. A device for cooling a capacitor with circulating water as set forth in claim 1, wherein one of said pair of fasteners secure one of the plural electrical terminals of the capacitor to one of said pair of collector bars, and the other of said pair of fasteners secure the other of the plural electrical terminals of the capacitor to the other of said pair of collector bars.

\* \* \* \* \*